(12) United States Patent
Rodriguez et al.

(10) Patent No.: US 8,433,728 B2
(45) Date of Patent: Apr. 30, 2013

(54) SYSTEM AND METHOD FOR CREATING AND MANAGING BUSINESS OBJECTS

(75) Inventors: Ignacio Rodriguez, Buenos Aires (AR); Leandro Luck, Buenos Aires (AR); Paulo Gustavo Veiga, Buenos Aires (AR); Emilio Lopez Gabeiras, Buenos Aires (AR); Pablo Grosso, Capital Federal (AR); Ignacio Manzano, Buenos Aires (AR); Juan Cruz Nores, Buenos Aires (AR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/047,671

(22) Filed: Mar. 14, 2011

(65) Prior Publication Data
US 2012/0239701 A1 Sep. 20, 2012

(51) Int. Cl.
*G06F 17/30* (2006.01)
(52) U.S. Cl.
USPC ............................ 707/795; 707/803; 707/823
(58) Field of Classification Search .................. 707/795, 707/802, 803, 823; 705/1, 7, 10, 31
See application file for complete search history.

(56) References Cited

U.S. PATENT DOCUMENTS

| | | | |
|---|---|---|---|
| 6,496,831 B1 * | 12/2002 | Baulier et al. ........................ 1/1 |
| 7,730,162 B2 * | 6/2010 | Lynch et al. .................. 709/218 |
| 8,065,315 B2 * | 11/2011 | Rapp et al. .................... 707/759 |
| 2007/0250405 A1 * | 10/2007 | Ronen et al. ..................... 705/27 |
| 2008/0120129 A1 * | 5/2008 | Seubert et al. .................... 705/1 |
| 2008/0127052 A1 * | 5/2008 | Rostoker ....................... 717/105 |
| 2008/0189679 A1 * | 8/2008 | Rodriguez et al. ............ 717/105 |
| 2009/0125766 A1 | 5/2009 | Safarpour et al. |
| 2009/0249290 A1 * | 10/2009 | Jenkins et al. ................ 717/109 |
| 2009/0249446 A1 * | 10/2009 | Jenkins et al. .................... 726/3 |
| 2009/0327105 A1 * | 12/2009 | Moussa et al. .................. 705/29 |
| 2010/0153150 A1 * | 6/2010 | Prigge et al. ...................... 705/7 |
| 2010/0153432 A1 * | 6/2010 | Pfeifer et al. ................. 707/769 |
| 2011/0078606 A1 * | 3/2011 | Hoff et al. ..................... 715/771 |
| 2011/0154253 A1 * | 6/2011 | Lehr et al. ..................... 715/810 |

* cited by examiner

*Primary Examiner* — Shahid Alam
*Assistant Examiner* — Andalib Lodhi
(74) *Attorney, Agent, or Firm* — Fliesler Meyer LLP (57) ABSTRACT

A system and method of creating and managing one or more business objects is provided. The method can include receiving a request to create a business object and presenting a first user interface that is used to create a business object. The user interface can include one or more fields that define attributes and methods in the business object. The method can further include presenting a second user interface that is used to add documentation information for the business object, and storing the business object. The attributes and methods of the business object can be stored in separate files.

18 Claims, 6 Drawing Sheets

```
BObject
  BObject  ~300
  Description [____________] ~302
  ⊟ Attributes ~304
    ⊞ attribute1 String Not Null
    ⊟ attribute1 String Not Null
        Description    [____________]
        Documentation [...]
        Type          [____▼][...]
        Accepts Null  ☐
        Default Value ○ [____________]
                      ⊙ Null
    ⊞ attribute2 Int    Not Null
    ⊞ attribute3 String Not Null
    ⊞ attribute4 Int
  ⊟ Methods ~306
    ⊟ Constructor
        Description    [____________]
        Documentation [...]
        Return Type   [____▼][...]
        Arguments     [...]
    ⊞ methodName1 (Int,String):String
    ⊞ methodName2 (Int):String
    ⊞ methodName3 (Int,String):Int
    ⊞ methodName4 ():Int
  | BPM | History |
```

SYSTEM AND METHOD FOR CREATING AND MANAGING BUSINESS OBJECTS

CROSS REFERENCE TO RELATED APPLICATIONS

This application is related to U.S. Patent Applications "SYSTEM AND METHOD FOR MAINTAINING A BUSINESS CATALOG" (Ser. No. 13/047,645), which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to Business Process Management (BPM) systems and particularly to a system and method for creating and managing business objects.

BACKGROUND

Business Process Management (BPM) systems enable users to design and manage business processes while hiding much of the technical, implementation details that the typical business user does not understand or is not interested in. Executable Business Process languages, such as BPMN, operate at a high level (processes, tasks, lanes, flows, etc) for the ease of the typical business user. This high level of abstraction, however, can break down when data and services are manipulated. At this level, XML artifacts can start to appear (XSDs, WSDLs, XPATH, etc.), making processes more difficult for non-technical users to understand.

SUMMARY

A system and method of creating and managing one or more business objects is provided. The method can include receiving a request to create a business object and presenting a first user interface that is used to create a business object. The user interface can include one or more fields that define attributes and methods in the business object. The method can further include presenting a second user interface that is used to add documentation information for the business object, and storing the business object. The attributes and methods of the business object can be stored in separate files.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

A system and method of creating and managing one or more business objects is provided. The method can include receiving a request to create a business object and presenting a first user interface that is used to create a business object. The user interface can include one or more fields that define attributes and methods in the business object. The method can further include presenting a second user interface that is used to add documentation information for the business object, and storing the business object. The attributes and methods of the business object can be stored in separate files.

In accordance with an embodiment, complex syntax required by typical expressions can be simplified so that they can be utilized more readily by business users, without needing to know how data is represented internally. For example, in systems of the prior art, a business user who needs to refer to the city name of a customer in an invoice, could use an expression such as:

bpmn: getDataObject ('invoice')/ns:invoice/customer/address/@city However, using the simplified syntax, in accordance with various embodiments of the present invention, the business user could refer to the same information using an expression such as:

invoice.customer.address.city

In accordance with an embodiment, the dotted syntax of the above expression reflects the hierarchical structure presented to the business user in the user interface (UI). The simplified expression can be converted to an equivalent XPATH (or similar) expression, while remaining standards-compliant. Similarly, a conversion in the other direction, from an XPATH (or similar) expression to a simplified expression, can also be executed by the system. The system automatically handles the underlying details, such as the 'city' is an XML attribute, rather than an entity, and in which namespaces each entity is declared in. Additionally, this conversion can add support for handling decimal numbers where such support is not natively provided.

Such simplification of XML expressions can also be extended to Business Objects and Business Processes. Executable process languages such as BPMN are heavily based on XML technologies. In many cases, services and components already exist and cannot be changed. However, these services and components can be decorated (e.g., cosmetic changes such as names, and substantive changes such as adding or disabling behavior), while remaining compliant with existing standards. Allows business users to interact with technical assets from a Business Process perspective. The business catalog used in conjunction with process work as boundary objects enabling communication between IT and business.

Figure 1:
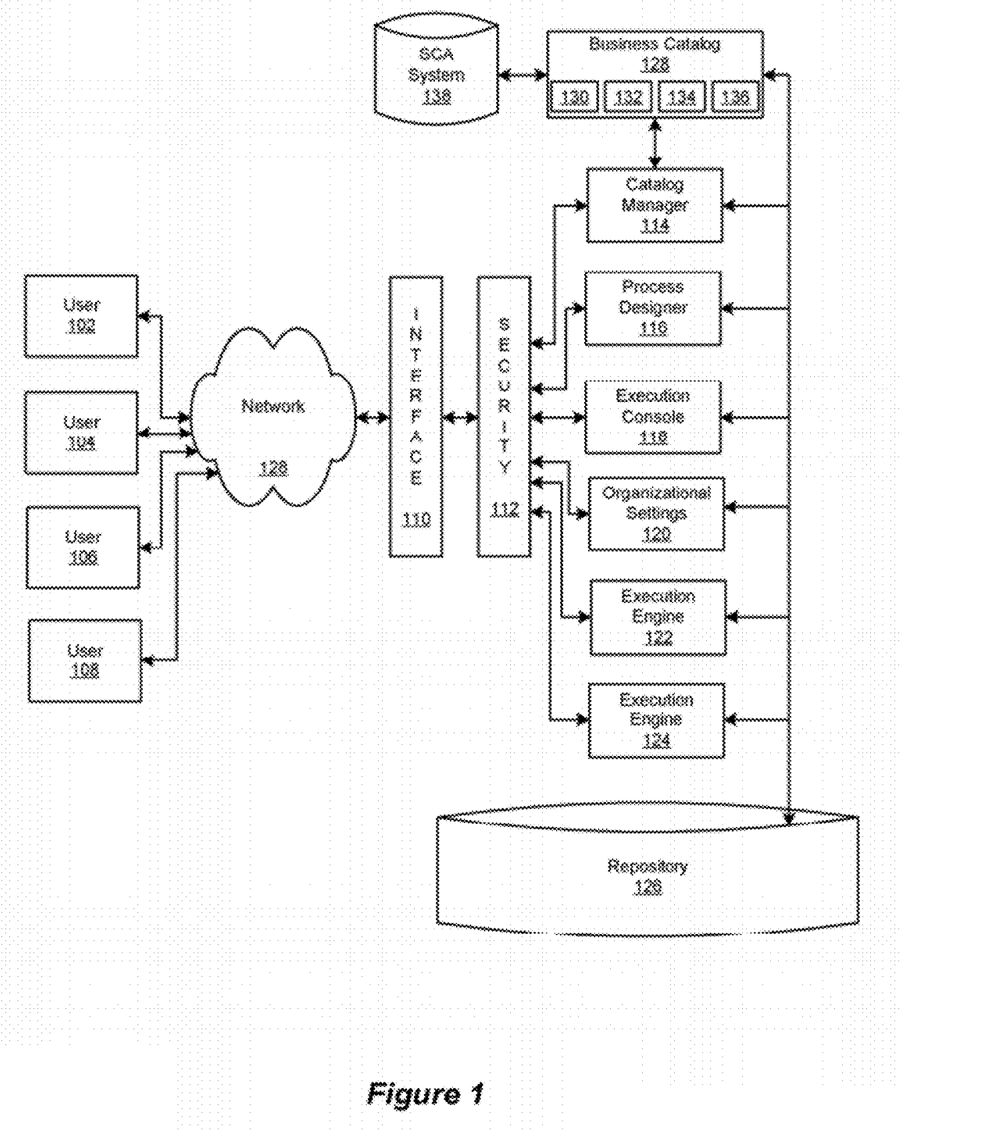
FIG. 1 is an illustration of an exemplary business process management system, in accordance with an embodiment.

FIG. 1 is an illustration of an exemplary business process management system, in accordance with an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a business process management system can include a set of software modules that can be accessed via a network 128 (e.g. the internet), by various users 102, 104, 106, 108. The network 128 can include wired or wireless communication-based, radio frequency (RF)-based, satellite, microwave or any other form of communication network where exchange of data is enabled between the components connected thereto. In various embodiments, the BPM system includes an interface layer 110, such as a graphical user interface (GUI) accessible via a website or portal, for allowing a user to design, manipulate, execute and monitor the performance of various processes. Furthermore, the system can include a security layer 112 that enables user authentication and authorization of services to the system.

In one embodiment, the BPM system includes a catalog manager 114 that is used to define and specify the components or programs that are called from a business process. These BPM components can include compiled software programs, classes or routines that are stored by the catalog manager in a data repository 126 or in a business catalog 130. In one embodiment, the catalog manager defines, describes and organizes the software components.

The process designer module 116 can be used to draw and design business process models by the users of the BPM system. Once the process is designed by using the process designer, its definition file can be generated and stored on a local or remote computer. The designer can also publish the created business processes. Once the designed business process is published, it can be stored into the data repository 126 and can later be deployed to an execution engine 122, 124 for executing.

The execution console 118 can be used by various users of the system in order to manage any of the execution engines 122, 124 which have process instances executing thereon. In one embodiment, the execution engines are used to deploy the published business processes, execute tasks by the users, and perform automatic business process activities and perform any other tasks needed by each activity of the process instance. The execution engines 122, 124 can manage the execution of each process instance. One example of such process instance is processing a specific sales order using a general business process for processing sales orders. The execution engine can retrieve and collect business process definitions from the repository, manage the execution of a particular user-interactive task or automatically execute the task if it is automated.

A BPM server can maintain the state of each executing process instance in the repository 126. A repository can include a relational database management system (RDBMS), file storage, content management systems as well as any other form of data storage systems. During the execution of the instance, persistent variables can maintain the values for each activity/task of the specific process instance. These variables can be stored in the repository and can be associated with the specific process instance.

In various embodiments, persistent variables can include instance variables and argument variables. Instance variables can record values that may be passed from one activity of a business process to another activity within the same business process. As such, instance variables maintain the state of the instance within the context of the business process. Argument variables, on the other hand record values that may be passed from one business process or instance to another business process or instance.

In accordance with an embodiment, the business catalog 130 can be used to combine service component architecture (SCA) with business processes. Using the business catalog, the functionality of SCA can be provided while hiding implementation details that an ordinary business user is not interested in. The business catalog can be populated with a plurality of business objects 132-138 representing components gathered from an SCA System 140 and user-created components added directly to the business catalog or stored in the repository. The components in the business catalog are made available for process designers to incorporate into their business processes as needed.

Figure 2:
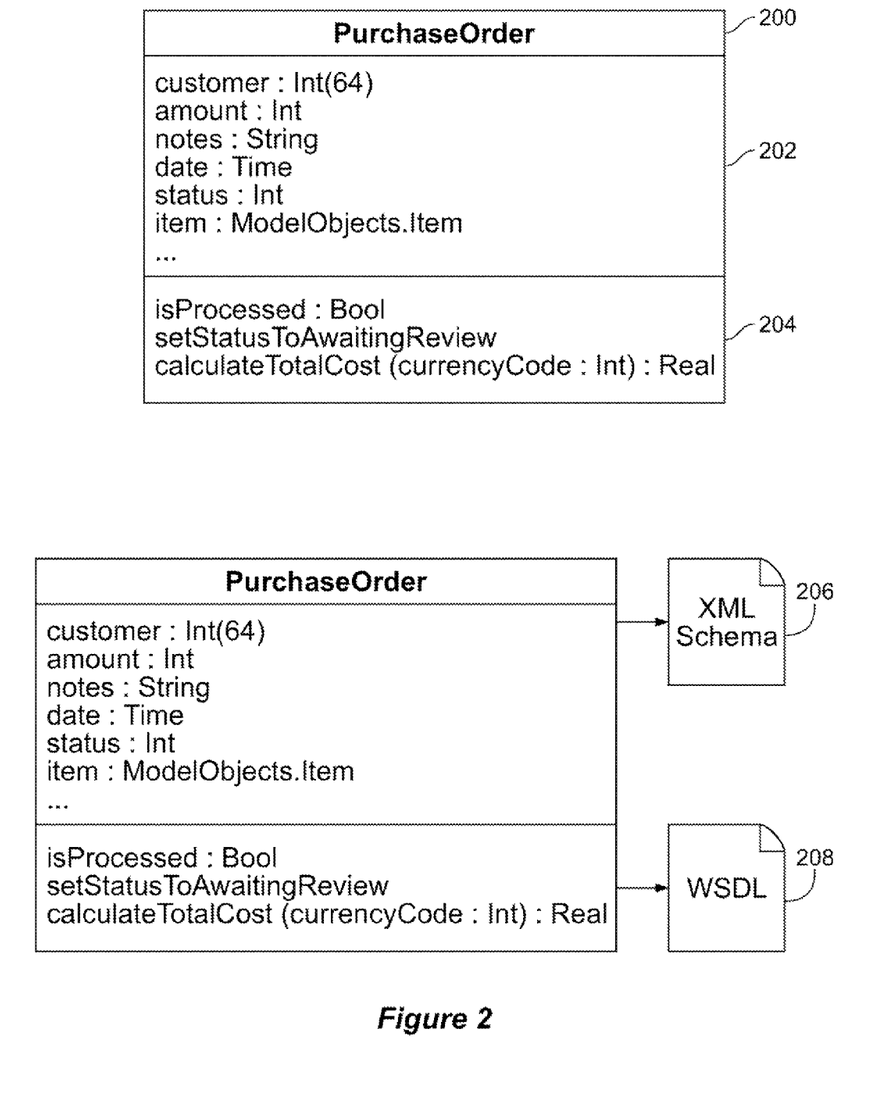
FIG. 2 shows an example of a business object in accordance with an embodiment.

FIG. 2 shows an example of a business object in accordance with an embodiment. The title 200 of the business object is PurchaseOrder and it can include one or more attributes 202 and one or more methods 204. These can be modeled using an XML schema 206, such as XSD, and a web services description language (WSDL) file 208. As shown in FIG. 2, the WSDL can include operation definitions and component implementation details (e.g., the methods), and the XML schema can include the data definition (i.e., attributes). Each of the WSDL and the XML schema are standards-compliant. A set of custom bindings can be defined that decorate operations with implementations details. For example, these can include a localized name, a localized description, and implementation (script, existing service, etc.). Any information that cannot be directly represented in an XSD or WSDL file can be stored in a Bindings section of the WSDL file. Additionally, when a business object is created from an external XML Schema element or complex type, a new XSD file may not be created. Instead, the WSDL file can references the external XSD.

As used herein, a Business Object is a user-defined component that contains attributes and methods. A business object can be used to encapsulate any type of information that a process requires. Business objects can be used to represent business data objects within BPM processes, such as BPMN Data Objects. However, business objects can also extend the concept of BPMN Data Objects by enabling a user to add methods associated with them. These methods can be used to add additional features to the business objects, such as additional functionality and providing greater access to the internal state of the business object. Business objects can be thought of as Classes in an analogy with Object Oriented Languages. They can be used as wrappers for both data and functionality. This can make them easier to use and provide better performance compared to alternatives, such as using an XML file directly.

In accordance with an embodiment, attributes are data elements (e.g., variables), which can be used to store data that define and describe the business object. Attributes can be of simple types (e.g. String, Integer, etc) or complex types (e.g. other Business Objects). Methods are functions or subroutines which are associated with the business object. Supported methods are delegated methods, which are implemented by calling another method on an external service.

Business objects can provide a number of benefits. Once built, business objects can be reused across multiple processes, projects, and engines. Accordingly, the reusability of business objects reduces the cost associated with time invested in process development and maintenance. Additionally, external components, which may be implemented in different technologies, can be integrated by wrapping them in a business object. The functionally provided by multiple technologies and applications can be combined to create a new business service, which is not limited to a specific technology. Thus, a business object can be used to exchange information with supported external components.

Figure 3:
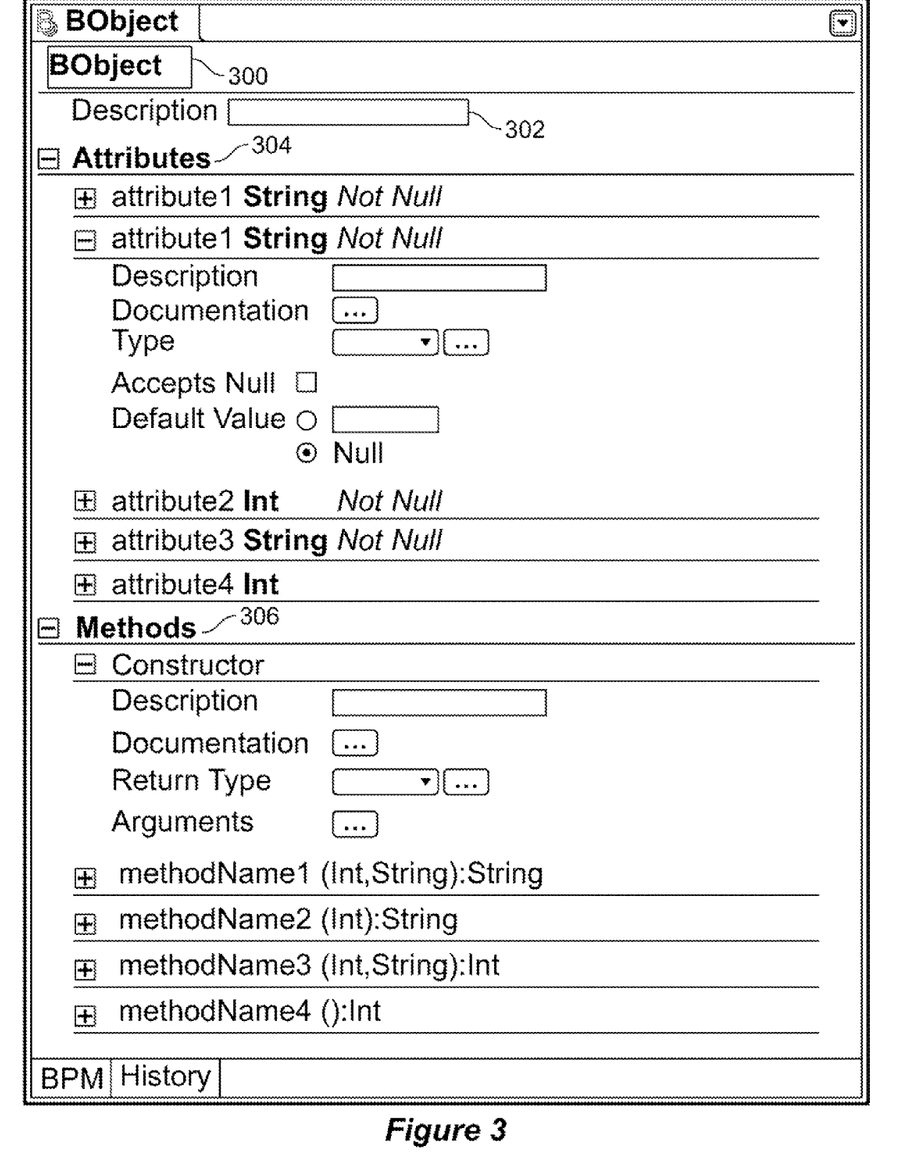
FIG. 3 shows a user interface for creating a business object, in accordance with an embodiment.

FIG. 3 shows a user interface for creating a business object, in accordance with an embodiment. Business objects can be created in several different manners. In one scenario, a business object can be created from scratch. As shown in FIG. 3, the user can create an empty business object on the Business Catalog to which the user can add attributes and methods. The user can name 300 the business object and optionally provide a description 302. Then, the user can add attributes 304 and methods 306. When creating a business object from scratch attributes types can include a subset of basic XML Schema types and/or another business object or external XSD. Basic XML schema types can include string, byte, short, int, long, boolean, float, double, decimal, date, time dateTime, duration and base64Binary as well as Java or other equivalent types.

Additionally, in accordance with an embodiment, a user can create a new business object based on an existing XML Schema complex type or element. In this case, the business object can import the selected schema and use the complex type elements as attributes. The user can also add methods to the business object. When creating a business object from another business object or an external XSD, a simplified conceptual view of the underlying type can be presented to the end-user. The XML Schema types can be translated to simple types and/or their equivalents in Java. Some XML Schema types may not be interpreted as valid attribute structures (e.g. Choice complexType), in those cases attributes corresponding to those types may not be created in the business object, and the instance data can be accessed by navigating the DOM tree. In accordance with an embodiment, the XML Schema complex type or element can be either in an XSD file or included inline in a WSDL file, in the later case, the resultant business object cannot be used as an attribute for a different business object.

In accordance with an embodiment, a business object can also be created from an external service. A user can select an existing External Service, such as a SOA Adapter, and create a business object by promoting a subset of the selected service's operations into the Business Catalog. The resulting business object includes that subset of operations and, when those operations are invoked, execution of those operations can be delegated to the original external service. The business object can also import any XML schema or schemas that the external service is using. The delegated methods are static.

In accordance with an embodiment, business objects can also be used as exceptions in a BPMN Process (e.g., BPMN errors). In this context, these business objects can be referred to as error object, and provide similar capabilities and features as ordinary business objects, but are flagged as errors and can be used as such.

Figure 4:
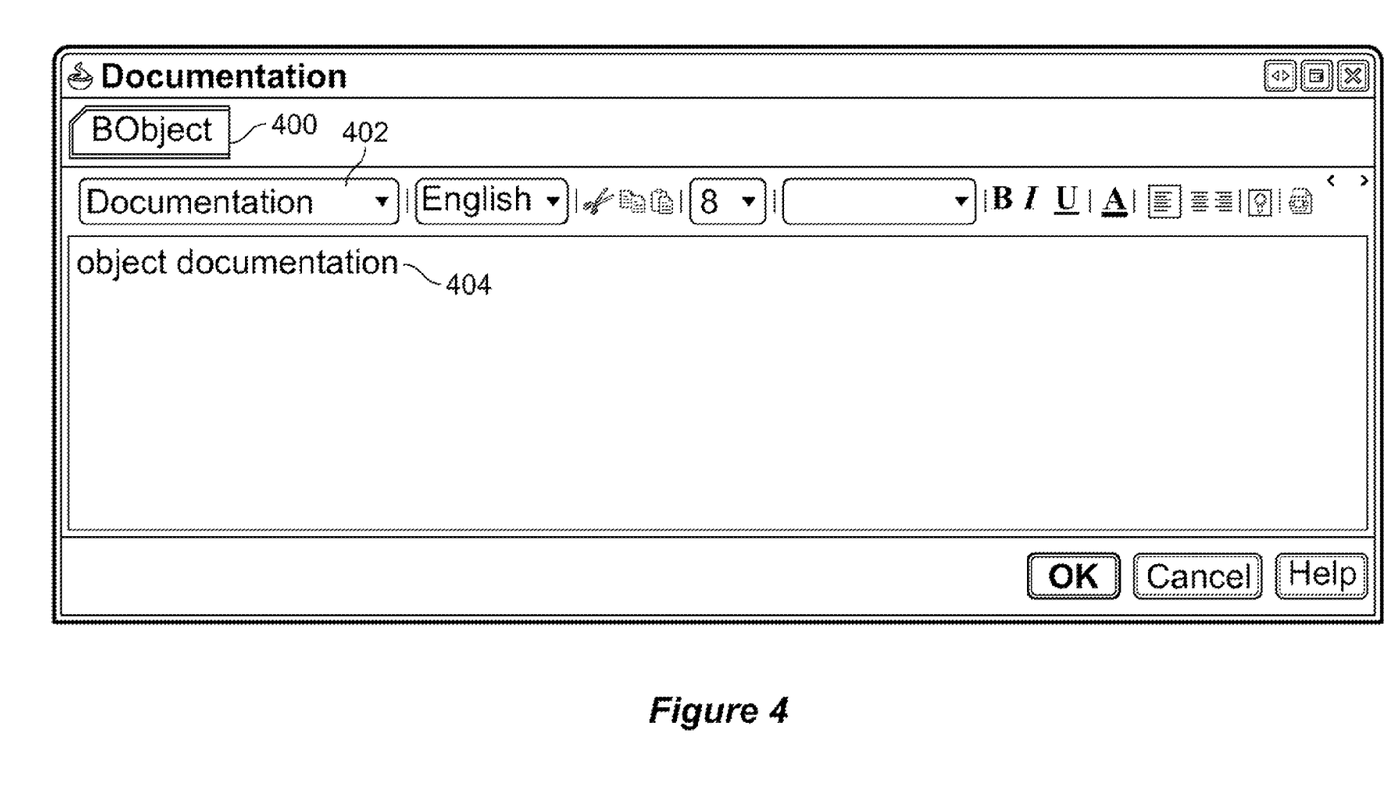
FIG. 4 shows a user interface for adding documentation for a business object, in accordance with an embodiment.

FIG. 4 shows a user interface for adding documentation for a business object, in accordance with an embodiment. In accordance with various embodiments, business objects can support different kinds of documentation information, which can be applied to different documentable sections of the business objects. As shown in FIG. 4, for a particular business object 400, a user can select the kind of documentation information 402 to be added and then add the documentation information to field 404. These kinds of documentation information can include Documentation, Use Case Documentation and Description. Documentation can be used to represent the full documentation of a particular element such as a business object, attribute or method. This kind of documentation information is internationalizable. Use Case documentation describes various use case examples for a particular business object, attribute or method. This kind of documentation information is also internationalizable. Description can provide a brief description of a business object, attribute, method or argument. This kind of documentation information is, generally, not internationalizable.

Figure 5:
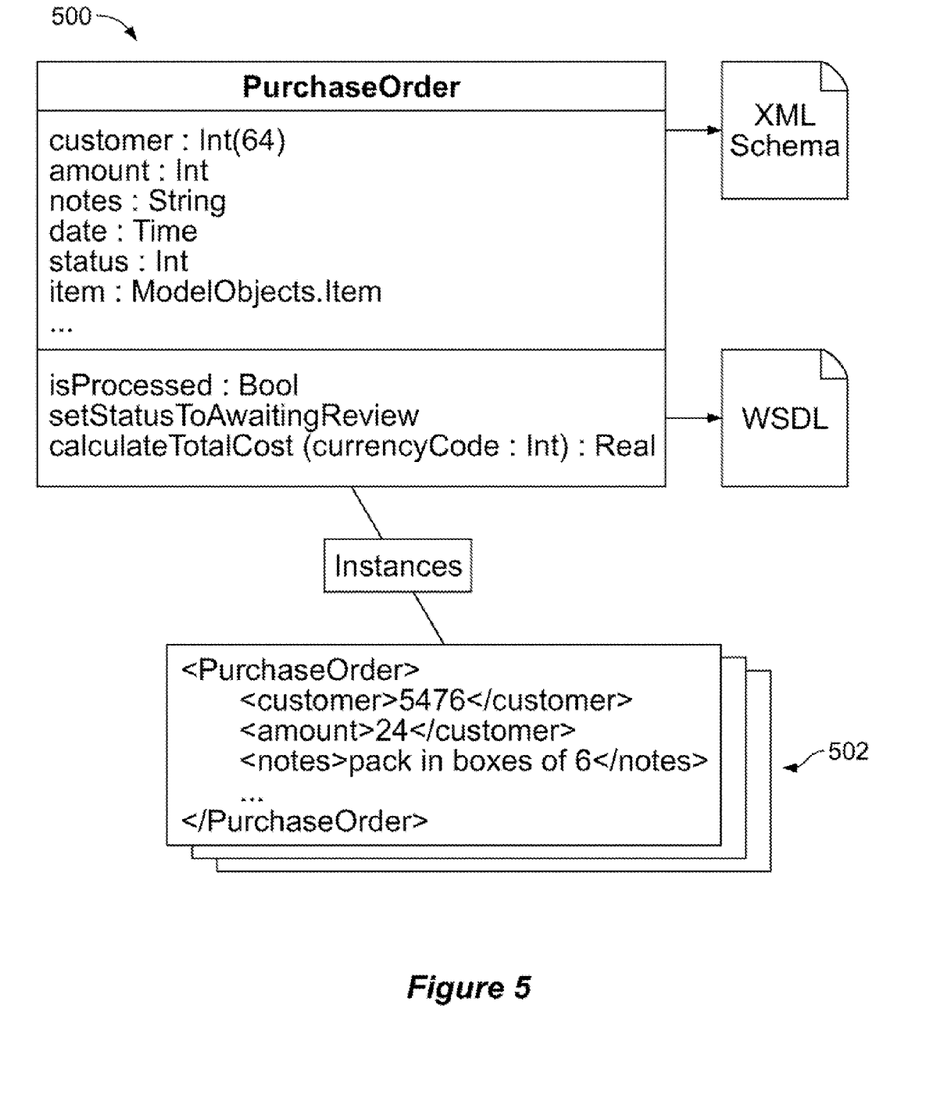
FIG. 5 shows an example of business object instances, in accordance with an embodiment.

FIG. 5 shows an example of business object instances, in accordance with an embodiment. A business object's 500 instance data 502 can be persisted in XML format as an Instance Document of the XML Schema. At runtime, a business object's internal data structure can be based on a document object model (DOM) such as the Oracle XDK DOM Elements, available from Oracle Corporation, Redwood Shores, Calif. This internal representation can ease integration with a BPMN Engine and can help avoid expensive internal processing. A BPM Compiler can be used to generate a Java class for each business object with getter/setter methods for each attribute that can access/update the internal XML DOM Tree structure.

Figure 6:
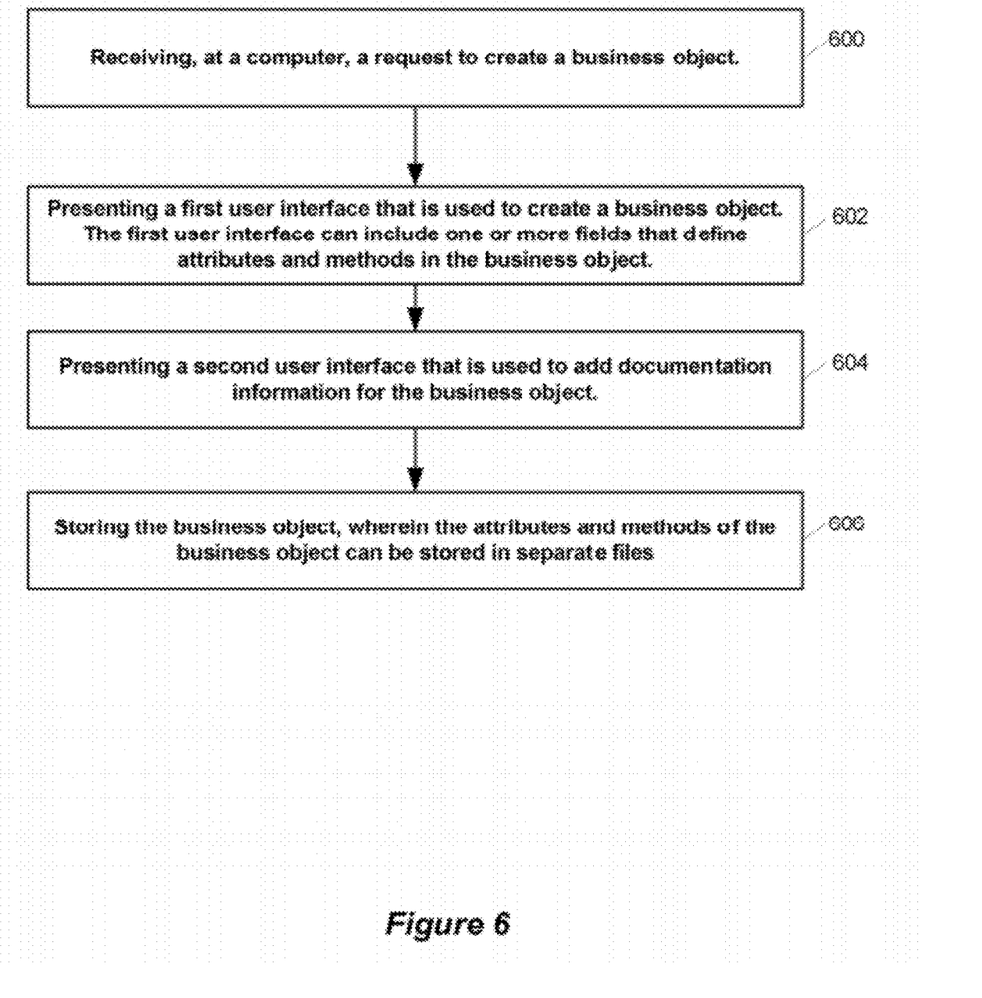
FIG. 6 shows a flowchart of a method of creating and managing a business object, in accordance with an embodiment.

FIG. 6 shows a flowchart of a method of creating and managing a business object, in accordance with an embodiment. At step 600, a request to create a business object is received. At step 602, a first user interface is presented. The first user interface can be used to create a business object. The first user interface can include one or more fields that define attributes and methods in the business object. At step 604, a second user interface is presented. The second user interface can be used to add documentation information for the business object. At step 606, the business object is stored. The attributes and methods of the business object can each be stored in separate files.

In the method shown in FIG. 6, the request can include a reference to a schema, in which case attributes can be automatically added to the business object based on the schema. Alternatively, the request can include a selection of an external service, in which case the business object can include a subset of the external service's operations. When the business object is invoked, execution of the subset is delegated to the external service. Additionally, the business object can be accessed through a business catalog, as shown in FIG. 1.

In accordance with an embodiment, the method shown in FIG. 6 can further include incorporating the business object into at least one business process, which can include a plurality of different business objects. The at least one business process can then be deployed. Additionally, and as described above, the business object can be defined using simplified expressions to represent attributes of the business object.

Each simplified expression can be translated to a standards-compliant expression at runtime.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method for creating and managing business objects for use within a business process, comprising:
    receiving, at a computer including one or more microprocessors, a request to create a business object, wherein the request includes a selection of an external service from a plurality of existing external services, and wherein each of the external services uses one or more schemas;
    presenting a first user interface, that executes on the one or more microprocessors and is used to create the business object, wherein the first user interface includes one or more fields that are used to define attributes and methods in the business object;
    presenting a second user interface that is used to add documentation information for the business object;
    incorporating a subset of the selected external service's operations into the business object, by importing one or more of the schemas used by the selected external service into the business object;
    storing the business object, wherein the attributes and methods of the business object are stored in separate files; and
    delegating execution to the selected external service when an operation belonging to that selected external service is invoked on the business object.

2. The method of claim 1, wherein the request includes a reference to a schema, and wherein attributes are automatically added to the business object based on the schema.

3. The method of claim 1, wherein the business object is accessed through a business catalog.

4. The method of claim 1 further comprising:
    incorporating into the business process a plurality of different business objects; and
    deploying the business process.

5. The method of claim 1, wherein the business object is defined using simplified expressions to represent attributes of the business object, and wherein each simplified expression is translated to a standards-compliant expression at runtime.

6. The method of claim 1, further comprising:
    providing an execution console that is capable of managing one or more execution engines adapted to having business process instances executing thereon,
        wherein the business process instances include one or more business process components, and
        wherein executing the business process instances on the one or more execution engines invokes the one or more business process components.

7. A system for creating and managing business objects for use within a business process, comprising:
    a first user interface that is used to create a business object, and executes on one or more microprocessors, wherein the first user interface includes one or more fields that are used to define attributes and methods in the business object, and wherein the first user interface is presented in response to a request to create a business object, wherein the request includes a selection of an external service from a plurality of existing external services, and wherein each of the external services uses one or more schemas;
    a second user interface that is operable to add documentation information for the business object; and
    a subset of the selected external service's operations, which are incorporated into the business object by importing one or more schemas used by the selected external service into the business object, wherein
        the business object is stored on one or more computers,
        the attributes and methods of the business object are stored in separate files, and
        execution is delegated to the selected external service when an operation belonging to that selected external service is invoked on the business object.

8. The system of claim 7, wherein the request includes a reference to a schema and wherein attributes are automatically added to the business object based on the schema.

9. The system of claim 7, wherein the business object is accessed through a business catalog.

10. The system of claim 7 wherein the business process includes a plurality of different business objects.

11. The system of claim 7, wherein the business object is defined using simplified expressions to represent attributes of the business object, and wherein each simplified expression is translated to a standards-compliant expression at runtime.

12. The system of claim 7, further comprising an execution console that is capable of managing one or more execution engines adapted to have business process instances executing thereon, wherein the business process instances include one or more business process components, and wherein executing the business process instances on the one or more execution engines invokes the one or more business process components.

13. A non-transitory computer readable storage medium including instructions stored thereon which, when executed by a computer, cause the computer to perform the steps comprising:
    receiving, a request to create a business object, wherein the request includes a selection of an external service from a plurality of existing external services, and wherein each of the external services uses one or more schemas;

presenting a first user interface, that executes on the one or more microprocessors and is used to create the business object, wherein the user interface includes one or more fields that are used to define attributes and methods in the business object;

presenting a second user interface that is used to add documentation information for the business object;

incorporating a subset of the selected external service's operations into the business object, by importing one or more of the schemas used by the selected external service into the business object;

storing the business object, wherein the attributes and methods of the business object are stored in separate files; and delegating execution to the selected external service when an operation belonging to that selected external service is invoked on the business object.

14. The non-transitory computer readable storage medium of claim 13, wherein the request includes a reference to a schema and wherein attributes are automatically added to the business object based on the schema.

15. The non-transitory computer readable storage medium of claim 13, wherein the business object is accessed through a business catalog.

16. The non-transitory computer readable storage medium of claim 13 further comprising:
incorporating into the business process a plurality of different business objects; and
deploying the business process.

17. The non-transitory computer readable storage medium of claim 13, wherein the business object is defined using simplified expressions to represent attributes of the business object, and wherein each simplified expression is translated to a standards-compliant expression at runtime.

18. The non-transitory computer readable storage medium of claim 13, further comprising providing an execution console that is capable of managing one or more execution engines adapted to have business process instances executing thereon,
wherein the business process instances include one or more business process components, and
wherein executing the business process instances on the one or more execution engines invokes the one or more business process components.

* * * * *

UNITED STATES PATENT AND TRADEMARK OFFICE
CERTIFICATE OF CORRECTION

PATENT NO. : 8,433,728 B2
APPLICATION NO. : 13/047671
DATED : April 30, 2013
INVENTOR(S) : Rodriguez et al.

Page 1 of 1

It is certified that error appears in the above-identified patent and that said Letters Patent is hereby corrected as shown below:

In the Specification

In column 5, line 37, delete "time dateTime," and insert -- time, dateTime, --, therefor.

Signed and Sealed this
Twenty-fourth Day of September, 2013

Teresa Stanek Rea
*Deputy Director of the United States Patent and Trademark Office*